United States Patent
Bayko et al.

(10) Patent No.: US 12,071,352 B2
(45) Date of Patent: Aug. 27, 2024

(54) METHOD OF MAKING HIGH QUALITY SILICON SULFIDE

(71) Applicant: Iowa State University Research Foundation, Inc., Ames, IA (US)

(72) Inventors: Dmitriy Pavlovich Bayko, Tucson, AZ (US); Steven Kmiec, Ames, IA (US); Steve W. Martin, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 368 days.

(21) Appl. No.: 16/974,249

(22) Filed: Dec. 1, 2020

(65) Prior Publication Data

US 2021/0292173 A1      Sep. 23, 2021

Related U.S. Application Data

(60) Provisional application No. 63/100,594, filed on Mar. 19, 2020.

(51) Int. Cl.
*C01B 33/00*      (2006.01)

(52) U.S. Cl.
CPC .......... *C01B 33/00* (2013.01); *C01P 2004/61* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 2,589,653 A | 3/1952 | Testado et al. | 23/206 |
| 2,766,103 A | 10/1956 | Nielsen | 23/206 |
| 5,843,391 A | 12/1998 | Yamamoto et al. | 423/344 |

FOREIGN PATENT DOCUMENTS

| | | | | |
|---|---|---|---|---|
| JP | 09278422 A | * | 10/1997 | C01B 33/00 |
| SU | 899464 A1 | * | 1/1982 | C01B 33/00 |

OTHER PUBLICATIONS

Machine translation of Yamamoto et al., JP H09278422 A (Year: 1997).*
Higashitani et al., Powder Technology Handbook, 4th Edition, 2019 (first published in Oct. 31, 2019), p. 518, https://www.taylorfrancis.com/books/edit/10.1201/b22268/powder-technology-handbook-fourth-edition-ko-higashitani-hisao-makino-shuji-matsusaka (Year: 2019).*
Machine translation of Leonid et al., SU 899464 A1 (Leonid) (Year: 1982).*
Krycer et al., Fine powder mixing in a vibratory ball mill, International Journal of Pharmaceutics, 1980, 6, 119-129 (Krycer) (Year: 1980).*
The chemistry of silicon-sulfur compounds, Angew. Chem. Internat. Edit., 1965, 4, 12 (Haas) (Year: 1965).*

* cited by examiner

*Primary Examiner* — Coris Fung
*Assistant Examiner* — Keling Zhang

(57) ABSTRACT

A method is provided for making high quality silicon sulfide having 4N (99.99% by weight) or better purity.

7 Claims, No Drawings

METHOD OF MAKING HIGH QUALITY SILICON SULFIDE

CONTRACTUAL ORIGIN OF THE INVENTION

This invention was made with government support under Grant No. DE-AR0000778 awarded by the U.S. Department of Energy. The government has certain rights in the invention.

FIELD OF THE INVENTION

The present invention relates to production of high quality (high purity) silicon sulfide.

BACKGROUND OF THE INVENTION

Silicon sulfide ($SiS_2$) is a useful material for the fabrication of solid electrolytes for use in batteries. Up to this point, the various methods of producing silicon sulfide have been low yield and/or resulted in the presence of inclusions of many impurities that would interfere with the properties of any compounds made using prior silicon sulfide. This is particularly noteworthy for glass making, as the impurities act as nucleation sites, reducing the practical use of the sulfide materials. U.S. Pat. Nos. 2,589,653; 2,766,103; and 5,843,391 describe certain prior methods for making silicon sulfide.

SUMMARY OF THE INVENTION

Embodiments of the present invention provide a method of making silicon sulfide ($SiS_2$) by a flux growth process that can achieve a high quality product purity, such as, for example, a high purity of silicon sulfide of 4N (99.99% by weight on a trace metal basis) or better.

An illustrative embodiment of the present invention involves control of initial precursor purity, such as initial purity of precursor silicon powder and sulfur powder of 5N or more as well as silicon particle size. The precursor silicon powder particles are mixed with an excess amount (excess of stoichiometry) of sulfur particles in a manner to coat the silicon particles with a sulfur coating. The coated silicon powder particles are heated in a vacuum or non-reactive atmosphere at a temperature for time, preferably with mechanical agitation such as rotation, to produce a silicon sulfide product as particulates. The reacted material then is subjected to a distillation treatment wherein unreacted, excess sulfur is selectively removed from the reacted material to produce the final high purity silicon sulfide product, which preferably has a purity of 4N (99.99% by weight trace metals basis) or better, and which is substantially single phase (e.g. 95-99% by volume of $SiS_2$.

These and other illustrative details for practicing embodiments of the present invention will become more apparent from the following detailed description of the invention.

DESCRIPTION OF THE INVENTION

The present invention provides illustrative method embodiments for making a high quality silicon sulfide ($SiS_2$) product by a flux growth process wherein the product has high quality product purity of 4N (99.99% by weight on a trace metal basis) or better and is substantially free of elemental precursor Si and S phases; e.g. preferably 95 to 99 volume % $SiS_2$.

Although illustrative embodiments of the present invention will be described with respect to certain example, practice of the invention is not limited to the example.

EXAMPLE

Starting Precursor Materials:

The starting silicon powder and sulfur powder both were sufficiently pure such as at least 5N (99.999% by weight on a trace metals basis). The silicon powder was purchased from Alfa Aesar, while the sulfur powder was purchased from Alfa Aesar. The silicon powder was chosen to have a powder particle size that minimizes kinetic factors such as diffusion and mass transport kinetics. For purposes of illustration and not limitation, silicon particle sizes of 1 to 20 microns diameter were used with sulfur powder particle sizes of 1 to 2000 microns.

The silicon powder and sulfur powder were subjected to intimate mixing for a time to coat the silicon particles with a sulfur layer or coating. For purposes of illustration and not limitation, mixing was conducted for 150 seconds in a Spex ball mill. The mixing was conducted in an inert atmosphere (<5 ppm $H_2O$ and $O_2$) to prevent oxidation of the silicon particles. The total mass of the silicon powder and the sulfur powder in the mixture are in proportions to achieve the desired composition with however the sulfur powder being present in an excess of stoichiometry of $SiS_2$ to ensure complete reaction and improve processability. For purposes of illustration and not limitation, the powder mixture composition included 20% excess sulfur (based on $SiS_2$ stoichiometry), such as 2.4S:1Si. Increasing the sulfur content of the powder mixture allowed for reduction of melting temperature of the synthesized compound described below, improving quality and reproducibility.

The intimately mixed powder mass then was placed inside a silica ampule (in inert atmosphere) and sealed under vacuum. The ampules were etched with ammonium bi-fluoride solution prior to use for purpose of cleaning the silica glass surface and to create an etched and therefore roughened surface that is believed to provide sites for initiating the reaction of the silicon and sulfur.

The sealed ampules were then placed in a rotating furnace and heated slowly to 970° C. to react the silicon particle and sulfur layer to produce a silicon sulfide reaction product. For purposes of illustration and not limitation, the heating profile included heating at 3° C./min to 150° C. and holding for 3 hours, heating 1° C./min to 400° ° C. and holding for 9 hours, heating 1° C./min to 560° C. and holding for 7 hours, heating 1° C./min to 800° ° C. and holding for 11 hours, heating 1° C./min to 900° C. and holding for 5 hours, and heating 1° C./min to 970° ° C. and holding for 5 hours. The ampule was rotated was set to between 5 and 20 RPM to ensure the sulfur coated silicon particles were well mixed and unconglomerated during the heating profile. It is believed that coating the individual silicon particles with sulfur through intimate mixing by rotation produces a higher purity silicon sulfide product by maximizing the reaction between silicon and sulfur and minimizing the agglomeration of the silicon particles. It is further believed that by melting the sulfur to the liquid state at 150° C. further enhances the reaction between silicon and sulfur by suspending the silicon as individual particles in the sulfur liquid. After the final isothermal hold at 970° C., the ampoule and its contents were cooled to 25° C. by free cooling in the furnace over a period of approximately 10 to 20 hours.

The reaction product so produced was a mixture of the desired high purity $SiS_2$ reaction product and the excess sulfur added to promote reaction between the silicon and sulfur.

The next step in the process was then to remove the excess sulfur from this reaction mass to create the final high purity $SiS_2$ product by thermally evaporating the excess sulfur away from the silicon sulfide and condensing it in a cold zone of the silica glass ampoule.

This evaporation and purification step was achieved by lowering the silica glass ampoule containing the sulfur and $SiS_2$ reaction mass into a vertical tube furnace such that approximately 80% of the length of the glass ampoule and essentially all of the silicon sulfide reaction product mass was inside the hot zone of the furnace. The vertical tube furnace was then heated at 1 to no more than 20° C./min up to 600° C. The ampoule was then held at this temperature for 1 to no more than 10 hours. The natural temperature gradient between the hot 80% of the glass ampoule and colder 20% of the ampoule created a cold zone where the evaporated excess sulfur would condensate.

After this first step, while still being heated, the silica glass ampoule was raised such that approximately 50% of its length remained in the hot zone and 50% of its length was exterior of the furnace and in the cold zone. The ampoule was then held in this condition for 1 to no more than 10 hours.

After this second step, while still being heated, the silica glass ampoule was raised such that approximately 30% of its length remained in the hot zone and 70% of its length was exterior of the furnace and in the cold zone. The ampoule was then held in this condition for 1 to no more than 10 hours.

After this third step, the ampoule consisted of the sulfur thermally evaporated and condensated in the upper portion of the silica glass ampoule well removed from the silicon sulfide and therefore it was effectively separated from the silicon sulfide thereby purifying the silicon sulfide.

Finally, the heated ampoule containing the now purified silicon sulfide was completely removed from the vertical tube furnace and laid horizontally on a heat resistant surface. In this way, if there were any remaining liquid sulfur in the ampoule, it would not flow into the purified silicon sulfide, but rather simply be contained in the upper cooled region of the sulfur.

It is believed that this is an important step because the temperature profile between the hot, 600° C. zone of the heated silicon sulfide and sulfur mass inside the vertical tube furnace and the cooler zone extant to the furnace is not sharp, but occurs over some distance of the ampoule. For this reason, it is believed that some of the sulfur condensates in this intermediate temperature zone. If left vertical, but outside of the furnace, some of this sulfur in this intermediate zone has been observed to flow downward back into the purified silicon sulfide reaction product, thereby partially reversing the purification process and thereby contaminating the silicon sulfide.

It is believed that this recontamination of the silicon sulfide by the evaporated and condensed sulfur is possible by the unique flow behavior of sulfur whereby it becomes less viscous with decreasing temperature and is more prone to flow at colder temperatures. Nearly all other liquids do not become less viscous with decreasing temperature, rather they become more viscous with decreasing temperature. It is believed that this reflow at lower temperatures is unique to sulfur do its unique temperature dependence of its viscosity.

The ampoule and its contents were then taken inside a high-quality glove box with $O_2$ and $H_2O$ levels less than about 10 ppm. The resulting high purity silicon sulfide was then removed from the ampoule and stored in an inert atmosphere. Special care was taken in opening the silica glass ampoule to insure that no silica, $SiO_2$, glass particles were intermixed into the high purity $SiS_2$ reaction product and that none of the evaporated and condensated excess sulfur likewise was not intermixed into the silicon sulfide reaction product. In this way, the high purity of the reaction product could be retained while removing it from the silica glass ampoule.

The silicon sulfide produced as described in this example had a measured purity of 4N and was substantially single phase; i.e. 95 to 99 volume % $SiS_2$ with elemental sulfur precursor being the remainder of the impurity phases. The chemical purity and phase purity were measured by FTIR and Raman spectroscopy and XRD analysis. FTIR spectroscopy was used to determine that the oxide contamination in the silicon sulfide reaction product as no more than 5 volume % and very often less than 1 volume %. Likewise, Raman spectroscopy was used to determine that the unreacted sulfur contamination in the silicon sulfide reaction product was no more than 5 volume % and very often less than 1 volume % or non-observable. Finally, the XRD powder pattern of the silicon sulfide reaction product showed 100 volume % phase purity for $SiS_2$ as compared against the ICSD-16952 $SiS_2$ pattern for phase pure material.

Although the invention has been described with respect to certain embodiments, those skilled in the art will appreciate that modifications and changes can be made thereto within the scope of the invention as set forth in the appended claims.

We claim:

1. A method of making silicon sulfide, comprising mixing silicon powder particles and sulfur powder particles in an inert atmosphere in a manner that coats the silicon powder particles with sulfur and prevents oxidation of the silicon powder particles wherein the sulfur powder particles provide an amount of sulfur that is present in an excess of stoichiometry of the silicon sulfide to be made, heating the sulfur-coated silicon particles disposed in a container to a final temperature for a time with motion of the container to react the silicon and the sulfur to form silicon sulfide reaction product, and removing excess sulfur from the silicon sulfide reaction product to produce the silicon sulfide with a purity of 4N (99.99% by weight on a trace metals basis) or better, wherein the mixing produces a powder mass consisting of the sulfur-coated silicon particles and excess sulfur.

2. The method of claim 1 wherein the mixing of the silicon powder particles and the sulfur powder particles is conducted by powder ball milling.

3. The method of claim 1 wherein the silicon powder particles have a diameter in a range of 1 to 20 microns.

4. The method of claim 1 wherein the motion of the container of the sulfur-coated silicon particles during heating produces the silicon sulfide reaction product as particulates.

5. The method of claim 1 wherein the container of the sulfur-coated silicon powder particles is disposed in a rotating furnace.

6. The method of claim 1 wherein the excess sulfur is removed by distillation of the excess sulfur from the silicon sulfide reaction product.

7. A method of making silicon sulfide, comprising ball milling silicon powder particles and sulfur powder particles in an inert atmosphere to produce ball milled powders in which the silicon powder particles are coated with sulfur and to prevent oxidation of the silicon powder particles wherein the sulfur powder particles provide an amount of the sulfur that is present in an excess of stoichiometry of the silicon sulfide to be made, heating the ball milled powders disposed in a container to a final temperature for a time with motion of the container to react the silicon and the sulfur to form silicon sulfide reaction product, and removing excess sulfur from the silicon sulfide reaction to produce the silicon sulfide with a purity of 4N (99.99% by weight on a trace metals basis) or better, wherein the mixing produces a powder mass consisting of the sulfur-coated silicon particles and excess sulfur.

* * * * *